(12) United States Patent
Finetti et al.

(10) Patent No.: US 8,808,099 B2
(45) Date of Patent: Aug. 19, 2014

(54) PROTECTIVE SCREEN FOR CONSTANT-VELOCITY JOINTS AND WHEEL HUB-BEARING/CONSTANT-VELOCITY JOINT UNIT PROVIDED WITH SAID PROTECTIVE SCREEN

(75) Inventors: William Finetti, La Loggia (IT);
Dominik Fischer, Wasserlosen (DE)

(73) Assignee: Aktiebolaget SKF, Gothenburg (SE)

( * ) Notice: Subject to any disclaimer, the term of this patent is extended or adjusted under 35 U.S.C. 154(b) by 29 days.

(21) Appl. No.: 13/550,704

(22) Filed: Jul. 17, 2012

(65) Prior Publication Data

US 2013/0184086 A1 Jul. 18, 2013

(30) Foreign Application Priority Data

Jul. 29, 2011 (IT) .................... TO11A0697

(51) Int. Cl.
*F16C 19/16* (2006.01)
*F16D 3/84* (2006.01)

(52) U.S. Cl.
USPC .......................................... 464/178; 277/572

(58) Field of Classification Search
USPC ........ 464/7, 15, 178, 182, 904–906; 475/159; 277/549, 551, 572, 573, 574, 576, 577
See application file for complete search history.

(56) References Cited

U.S. PATENT DOCUMENTS

| | | | |
|---|---|---|---|
| 5,445,049 A * | 8/1995 | Ullrich et al. | |
| 5,451,869 A * | 9/1995 | Alff | |
| 5,967,929 A * | 10/1999 | Matsuoka et al. | 475/159 |
| 6,286,909 B1 * | 9/2001 | Mizukoshi et al. | |
| 7,833,105 B2 * | 11/2010 | Nagayama et al. | 464/178 |
| 7,896,750 B2 * | 3/2011 | Brunetti et al. | 464/178 X |
| 2008/0285902 A1 | 11/2008 | Nagayama et al. | |
| 2010/0038958 A1 * | 2/2010 | Tsuzaki et al. | |

FOREIGN PATENT DOCUMENTS

| | | |
|---|---|---|
| EP | 0619438 A1 | 10/1994 |
| EP | 1630433 A2 | 3/2006 |
| JP | 2003049852 A | 2/2003 |

* cited by examiner

*Primary Examiner* — Gregory Binda
*Assistant Examiner* — Josh Skroupa
(74) *Attorney, Agent, or Firm* — Bryan Peckjian; SKF USA Inc. Patent Department

(57) ABSTRACT

A protective screen mounted on an outer cylindrical surface of a constant-velocity joint and facing towards a sealing device of a rolling-contact bearing which is angularly coupled to the constant-velocity joint for protecting the sealing device and the rolling-contact bearing from the action of external agents; the screen being provided with: an annular wall, which is transverse to an axis (A) of rotation of the constant-velocity joint and is arranged in axial abutment against a side wall of said constant-velocity joint, a central hole, which is made through the annular wall and through which a shaft of the constant-velocity joint passes with play, and a plurality of elastic mounting and centering fins, which are distributed uniformly about the central hole and extend unsupported from the annular wall such that they are coupled to the outer cylindrical surface of the constant-velocity joint.

11 Claims, 2 Drawing Sheets

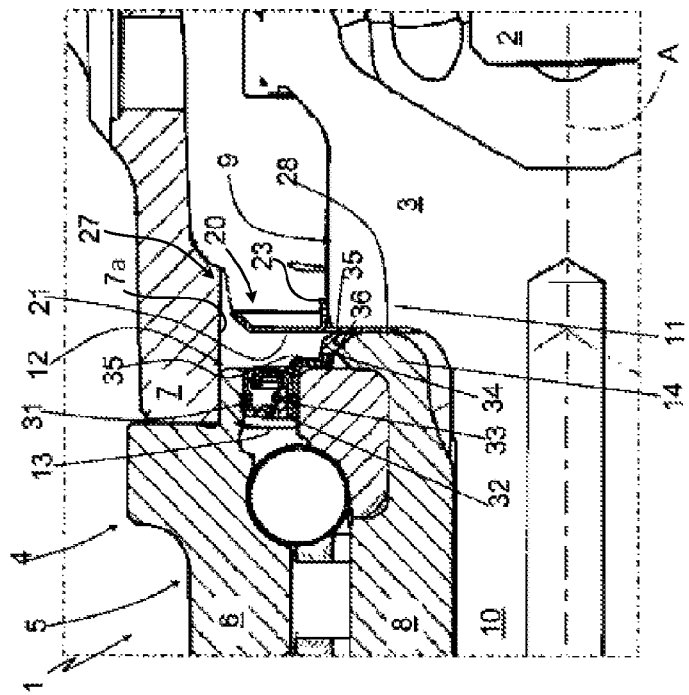

PROTECTIVE SCREEN FOR CONSTANT-VELOCITY JOINTS AND WHEEL HUB-BEARING/CONSTANT-VELOCITY JOINT UNIT PROVIDED WITH SAID PROTECTIVE SCREEN

CROSS-REFERENCE TO RELATED APPLICATION

This U.S. Non-Provisional Utility application claims the benefit of Italy Provisional Patent Application Serial No. TO2011A000697, filed on 29 Jul. 2011, which is incorporated herein in its entirety.

FIELD OF THE INVENTION

The present invention relates to a protective screen for constant-velocity joints. More particularly, the present invention relates to a wheel hub-bearing/constant-velocity joint unit provided with a protective screen.

BACKGROUND OF THE INVENTION

Constant-velocity joints are angularly coupled to wheel hub/bearing assemblies to transmit a rotary motion from a half-shaft engaged in the joint to a wheel supported by the wheel hub/bearing assembly, and operate in environments which are exposed to a particular degree to external agents, such as powder, debris, dirt and water.

Customarily, constant-velocity joints comprise an outer ring which is provided with a shaft inserted inside the wheel hub and coupled angularly to said wheel hub by means of a grooved profile. The bearing of the wheel hub/bearing assembly is, on the other hand, mounted on the wheel hub, or is provided with a flanged inner ring within which the shaft of the joint engages. In both cases, the bearing, or at least an intermediate space between an inner ring and an outer ring of said bearing, faces completely towards the outer ring of the joint, and therefore is completely exposed to the action of the external agents mentioned. To avoid the admission of impurities into the bearing, the latter is equipped with a sealing device mounted between the two rings so as to close the intermediate space, but the direct and constant exposure to the action of the external agents can bring about premature wear of the sealing device, in such a way that it may even lead to the infiltration of said agents into the area of coupling between the wheel hub and the shaft.

It is an object of the present invention to provide a protective screen for constant-velocity joints which not only makes it possible to protect the sealing device from the external agents, prolonging the service life, but can also be easily mounted on the constant-velocity joint irrespective of the manufacturing tolerances of said constant-velocity joint.

SUMMARY OF THE INVENTION

The present invention provides a protective screen for constant-velocity joints having the features indicated in the accompanying claims.

BRIEF DESCRIPTION OF THE DRAWINGS

The invention will now be described with reference to the accompanying drawings, which illustrate a non-limiting exemplary embodiment and in which:

FIG. 2 is a perspective view of the screen shown in FIG. 1;

FIG. 3 is a cross-sectional view of the protective screen shown in FIG. 2;

FIG. 4 shows, on an enlarged scale and in section, a detail of the screen shown in FIG. 3;

FIG. 5 is a sectional side view of a second preferred embodiment of a wheel hub-bearing/constant-velocity joint unit utilizing the protective screen provided according to the present invention; and FIG. 6 is a front elevation view of a preferred embodiment of the protective screen provided according to the present invention.

DETAILED DESCRIPTION OF THE INVENTION

Figure 1:
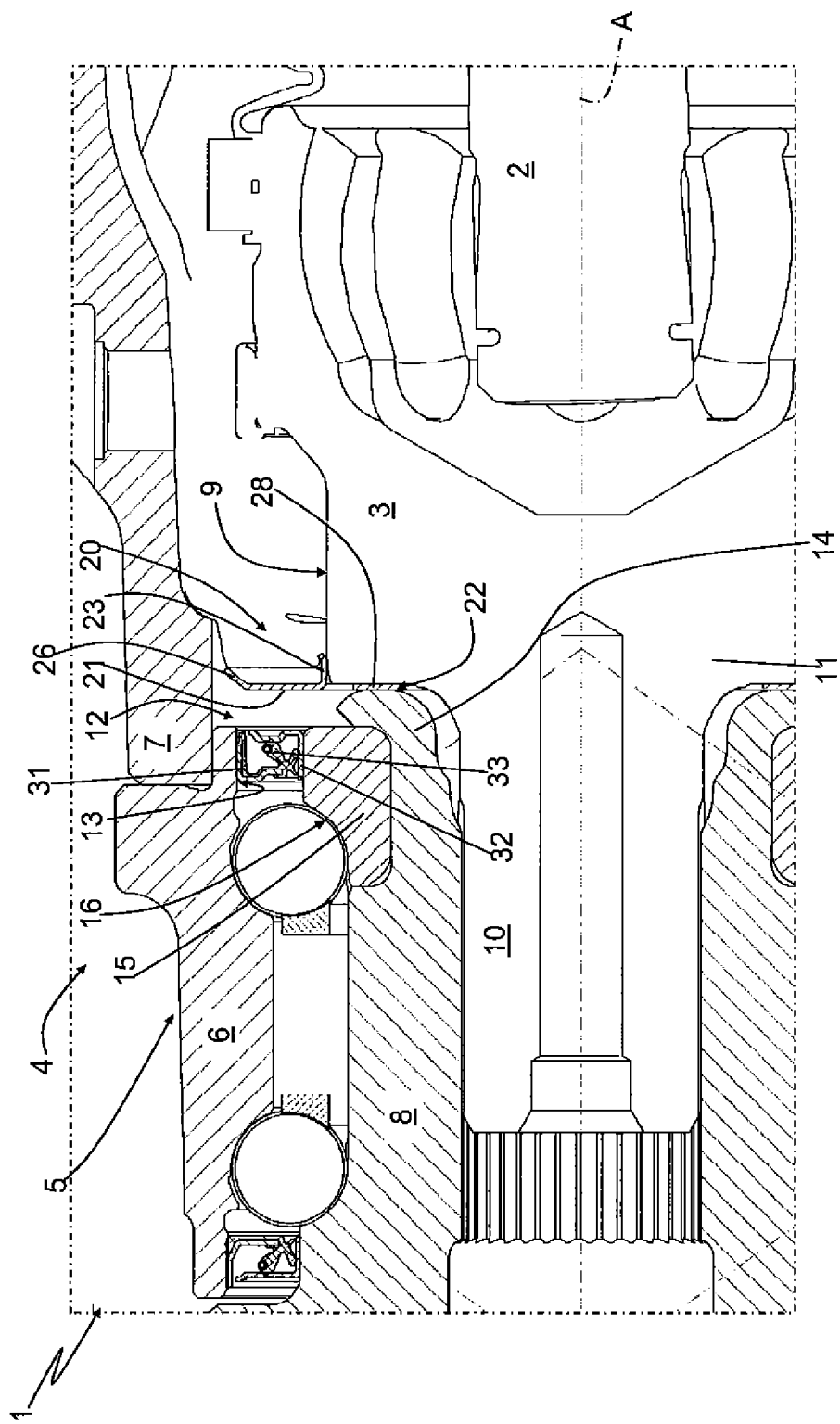
FIG. 1 is a sectional side view of a first preferred embodiment of a wheel hub-bearing/constant-velocity joint unit utilizing the protective screen provided according to the present invention.

With reference to FIG. 1, 1 denotes, in its entirety, a wheel hub-bearing/constant-velocity joint unit for transmitting a rotary motion about an axis A from a half-shaft 2 engaged in the constant-velocity joint 3 to a wheel (not shown) supported by the wheel hub/bearing assembly 4, which comprises a bearing 5 provided with an outer ring 6 mounted in a post 7 and with an inner ring 8, which is preferably but not necessarily flanged so as to support the wheel (not shown).

The constant-velocity joint 3 is laterally delimited by an outer cylindrical surface 9 and is provided with a grooved shaft 10, which extends axially from a side wall 11 of said constant-velocity joint 3 and engages into the inner ring 8 so as to rotate with said inner ring 8 about the axis A.

The bearing 5 is, in addition, provided with a sealing device 12 interposed between the outer ring 6 and the inner ring 8 so as to close an annular gap 13 defined by the two rings 6 and 8 and to protect the bearing 5 against the admission of external agents such as, for example, powder, sand, dirt or water.

In the embodiment shown in FIG. 1, the inner ring 8 of the bearing 5 also defines the hub of the assembly 1, and is also provided with a rolled rim 14 for axially blocking a so-called "small ring", that is a ring 15 provided with a respective raceway 16. However, the bearing 5 may also be of the type with two rows of rolling bodies mounted on a wheel hub, or else may also not have the rolled rim 14, despite the small ring 15 being axially blocked.

The unit 1 comprises, in addition, a protective screen 20, which is mounted on the outer cylindrical surface 9 of the constant-velocity joint 3 against the side wall 11 in a position which is axially opposite the sealing device 12 for protecting the sealing device 12 and the rolling-contact bearing 5 from the action of external agents, and, as is also shown in FIGS. 2 and 3, is provided with an annular wall 21, which is arranged transversely to the axis A and in axial abutment against the side wall 11, and with a central hole 22, which is made through the annular wall 21 and through which the shaft 10 of the constant-velocity joint 3 passes with play.

The screen 20 is made of metallic sheet material or, preferably, can be made of plastic material, and comprises a plurality of elastic mounting and centering fins 23, which are distributed uniformly about the central hole 22 and extend unsupported from the annular wall 21 such that they are coupled to the outer cylindrical surface 9 of the constant-velocity joint 3.

As shown more clearly in FIG. 4, the fins 23 are obtained by cutting the annular wall 21, defining respective windows 24, and are arranged in a substantially perpendicular manner with respect to the annular wall 21. The fins 23, which number three in the exemplary embodiment of the unit 1 and of the screen 20 shown in FIGS. 1 to 4, make it possible for the screen 20 to be mounted on the outer cylindrical surface 9 of the constant-velocity joint 3 irrespective of the degree of finish and of the degree of tolerance of said surface 9, and allow the screen 20 to be mounted on the constant-velocity joint 3 even before, if appropriate, it is moved or displaced for the assembly of said constant velocity joint 3 with the assembly 4. In other words, the elasticity of the fins 23 not only keeps the screen 20 joined to the constant-velocity joint 3, but also makes it possible to compensate for possible differences presented by the outer cylindrical surface 9, giving the screen 20 suitable characteristics so that it can also possibly be assembled with the unit 1 like a spare part, or on constant-velocity joints 3 originating from third party suppliers.

To facilitate, in addition, the mounting of the screen 20, the fins 23 have an end extension 25 bent slightly towards the outside of the axis A in order to act as an introduction bevel for said fins 23.

If the screen 20 is made of plastic material, the elastic fins 23 would instead be obtained by moulding, that is during the same moulding of the screen 20.

As is also shown in FIG. 6, the screen 20 is provided with five fins 23 distributed uniformly about the axis A. The number of fins 23 may, however, also be greater than five and may be selected depending on the dimensions of the screen 20 and of the constant velocity joint 3. In any case, the fins 23 have centering functions for the screen 20 with respect to the axis A and to the constant-velocity joint 3, and also allow for the screen 20 to be mounted on the constant-velocity joint 3 and for the totally safe movement of the latter without the possibility of accidental separation of the two components.

The protective screen 20 comprises, in addition, a deflector 26, which is integral with the annular wall 21 and extends radially towards the outside of said annular wall 21 and towards an inner surface 7a of the post 7 so as to define an annular through-channel 27 of very limited dimensions which are, in any case, inadequate for the passage of large quantities of water or dirt or other debris such as can damage the sealing device 12 when these external agents are conveyed directly against said sealing device 12.

The deflector 26 has a substantially conical shape with a conicity which tapers towards the bearing 5 so as to act, when in rotation with the constant-velocity joint 3 about the axis A, like a centrifuge for external agents at a large distance from the bearing 5. As will be explained more clearly herein below, the screen 20 rotates, in use, about the axis A together with the constant-velocity joint 3 and with the inner ring 8, and the rotation thereof brings about the centrifuging of any fluids or debris which may be in contact with said screen 20 or may be located in the immediate vicinity thereof. During said rotation and the centrifuging action, the shape of the deflector 26 makes it possible for any fluids or debris to be conveyed against the post 7 in an axially opposed direction with respect to the bearing 5, providing for an effective and efficient protective action, both dynamic and static, for said bearing 5 and for the relative sealing device 12.

Finally, the annular wall 21 comprises an annular rim 28, which radially outwardly delimits the central hole 22 and is in turn radially outwardly delimited by the elastic fins 23. The annular rim 28 is axially compressed between the bearing 5 and the side wall 11 of the constant-velocity joint 3 so as to make the screen 20 angularly integral with the inner ring 8 of the bearing 5 and with the constant-velocity joint 3 during rotation about the axis A. The dual clamping action exerted on the rim 28 by the bearing 5 from one side and by the constant-velocity joint 3 from an opposite side is exerted when the mounting of the unit 1 has been completed, that is when the shaft 10 and the inner ring 8 are axially closed with respect to one another by means, for example, of a screw (not shown). The clamping of the shaft 10 and of the inner ring 8 and the consequent axial compression of the annular rim 28 ensure that the screen 20 rotates about the axis A together with the inner ring 8 of the bearing 5 and with the constant-velocity joint 3.

With the bearing 5 equipped, as m the exemplary embodiment shown, with the rolled rim 14, the annular rim 28 is axially compressed between said rim 14 and the side wall 11 of the joint. In this case, the annular wall 21 has a flat shape inasmuch as the rolled rim 14 positions the screen 20 at an axial distance from the sealing device 12 which is equal to an axial dimension of said rolled rim 14.

If, however, according to an embodiment which is not shown, but is easily inferable from that which is described, the bearing 5 is not provided with the rolled rim 14, the screen 20 nevertheless remains blocked and angularly integral with the inner ring 8 of the bearing 5 and with the constant-velocity joint 3 during rotation about the axis A, but it is necessary to establish an axial positioning thickness between the sealing device 12 and the screen 20 in order to avoid relative instances of rubbing between the screen 20 and the fixed parts of the sealing device 10 or else of said bearing 5. Said axial positioning thickness is established either by turning the annular rim 28 on itself, in the case in which the screen 20 is made of metallic sheet material, or by forming the annular rim 28 with an axial thickness which is at least greater than an axial thickness of the annular wall 21, when the screen 20 is made of plastic material.

In both cases, the annular wall 21 may have a rib substantially in the proximity of the connections of the fins 23 so as to axially offset the annular wall 21 with respect to the rim 28 from the part of said fins 23.

In the exemplary embodiment described hitherto, the sealing device 12 is composed of two screens 31 and 32 respectively mounted in the outer ring 6 and on the inner ring 8 and of a lip 33 interposed between the two screens 31 and 32. Alternatively, as shown in FIG. 5, the sealing device 12 may also comprise at least one further sealing lip 34, which is supported by a mounting flange 35 forming part of the screen 32 and extends axially outside the inner ring 8 in such a way as to extend axially beyond the rolled rim 14 until it comes into contact with the annular wall 21 substantially at the annular rim 28.

The presence of the lip 34 makes it possible to seal off at least part of the annular rim 28 from the outside and, in addition, makes it possible to seal off the area of coupling between the inner ring 8 and the shaft 10 from the outside. In addition, in the exemplary embodiment shown in FIG. 5, the lip 34 has two free end portions 35 and 36, of which the portion 35 makes direct contact with the screen 20, whereas the portion 36 is arranged more to the inside towards the axis A with respect to the portion 35 and makes contact with the rolled rim 14: the dual contact, in addition to defining dedicated protection both for the rim 28 and for the rim 14, increases the sealing and protective capacity of the sealing device 10.

The protective screen 20 described above, and in the variants described above, has a high level of versatility and can be adapted so as to be coupled to different constant-velocity joints 3, while at the same time making it possible to enhance the protective characteristics for the unit 1 as described above.

It is to be understood that the invention is not limited to the embodiment described and shown here, which is to be considered to be an exemplary embodiment of the protective screen and of the wheel hub-bearing/joint unit, which in fact can be modified further in respect of the forms and arrangements of parts, and details relating to design and assembly.

We claim:

1. A protective screen for constant-velocity joints, the screen being mounted on an outer cylindrical surface of the constant-velocity joint and facing towards a sealing device of a rolling-contact bearing which is angularly coupled to the constant-velocity joint for protecting the sealing device and the rolling-contact bearing from the action of external agents; the screen comprising:
    an annular wall, transverse to an axis of rotation of the constant-velocity joint and arranged in axial abutment against a side wall of the constant-velocity joint,
    a central hole, extending through the annular wall, wherein a shaft of the constant-velocity joint passes through the central hole with play,
    a plurality of elastic mounting and centering fins, which are distributed uniformly about the central hole and extend unsupported from the annular wall such that they are coupled to the outer cylindrical surface of the constant-velocity joint,
    wherein the protective screen is mounted to the outer cylindrical surface of the constant-velocity joint such that, when the outer cylindrical surface rotates, the protective screen rotates therewith.

2. The protective screen according to claim 1, further comprising a substantially conical deflector integral with the annular wall for centrifuging external agents at a large distance from the bearing.

3. The protective screen according to claim 2, wherein the annular wall comprises an annular rim, which is interposed between the central hole and the elastic fins and is axially compressed, parallel to the axis of rotation, between the bearing and the side wall of the constant-velocity joint so as to rotate about the axis together with the constant-velocity joint.

4. The protective screen according to claim 3, wherein the annular rim has an axial thickness which is at least equal to an axial thickness of a transversely-extending portion of the annular wall.

5. The protective screen according to claim 4, wherein the elastic fins are obtained by cutting the annular wall.

6. The protective screen according to claim 5, further comprising the screen being made of metallic sheet material.

7. The protective screen according to claim 4, wherein the elastic fins are obtained by moulding.

8. The protective screen according to claim 7, further comprising the screen being made of plastic material.

9. A wheel hub-bearing/constant-velocity joint unit comprising:
    a constant-velocity joint, delimited by an outer cylindrical surface and provided with a grooved shaft extending axially from a side wall of said constant-velocity joint, and
    a wheel hub/bearing assembly, engaged internally by the shaft and provided with a sealing device arranged between an inner ring and an outer ring of the bearing,
    a protective screen, mounted on the outer cylindrical surface of the constant-velocity joint and against the side wall of the constant-velocity joint in a position which is axially opposite the sealing device for protecting the sealing device and the rolling-contact bearing from the action of external agents, wherein the protective screen is mounted to the outer cylindrical surface of the constant-velocity joint such that, when the outer cylindrical surface rotates, the protective screen rotates therewith, and wherein the protective screen comprises:
    an annular wall, arranged in axial abutment against the side wall of the constant-velocity joint,
    a central hole, that extends through the annular wall, the shaft of the constant-velocity joint passing through the central hole with play, and
    a plurality of elastic mounting and centering fins, which are distributed uniformly about the central hole and extend unsupported from the annular wall such that they are coupled to the outer cylindrical surface of the constant-velocity joint.

10. The unit according to claim 9, wherein the annular wall comprises an annular rim that delimits the central hole, is delimited by the elastic fins and is axially compressed between the bearing and the side wall of the constant-velocity joint.

11. The unit according to claim 10, wherein the sealing device comprises at least one sealing lip, arranged in contact with the protective screen so as to seal off at least part of the annular rim from the outside.

* * * * *